United States Patent [19]

Elhatem et al.

[11] Patent Number: 4,899,180

[45] Date of Patent: Feb. 6, 1990

[54] ON CHIP HEATER ELEMENT AND TEMPERATURE SENSOR

[75] Inventors: Abdul M. Elhatem, Hawthorne; Steven A. Buhler, Redondo Beach, both of Calif.

[73] Assignee: Xerox Corporation, Stamford, Conn.

[21] Appl. No.: 187,779

[22] Filed: Apr. 29, 1988

[51] Int. Cl.[4] .......................... G01D 18/00; B41J 3/04

[52] U.S. Cl. ................................. 346/140 R; 374/147

[58] Field of Search ................ 346/140; 374/152, 141, 374/147

[56] References Cited

U.S. PATENT DOCUMENTS

| | | | |
|---|---|---|---|
| 4,429,321 | 1/1984 | Matsumoto | 346/140 |
| 4,601,777 | 7/1986 | Hawkins | 346/140 X |
| 4,719,472 | 1/1988 | Arakawa | 346/140 |

*Primary Examiner*—Joseph W. Hartary
*Attorney, Agent, or Firm*—Robert E. Cunha

[57] ABSTRACT

This bubblejet device has integrated into it a number of heater resistors and a temperature sensor which operate in conjunction with a temperature regulating circuit to heat the chip to its optimum operating temperature within seconds of turn-on, and thereafter maintain that temperature regardless of local temperature variations. The precise temperature regulation of the array improves print quality.

2 Claims, 3 Drawing Sheets

ON CHIP HEATER ELEMENT AND TEMPERATURE SENSOR

BACKGROUND OF THE INVENTION

This is a circuit for controlling the temperature of an ink jet array fabricated in the form of a silicon device, and more specifically is a resistive heater and temperature sensor integrated on a device, or chip, to regulate its temperature.

Ink jet printers are potentially capable of being produced at lower cost than laser or xerographic printers, but their commercialization has been impeded by a lack of reliability. One problem is that variation in the temperatures of the ink and the jet mechanism result in impared performance.

It is customary, in the use of temperature sensitive electronic equipment, that the room or cabinet be supplied with a heater, cooling fan and thermostat to regulate its temperature, but it typically takes a long time for the temperature to stabilize, and permanent variations in temperature usually remain between system components depending on their location with respect to air flow and heat sources and sinks.

What is required is an ink jet array designed so that it can quickly be brought to its operating temperature and is thereafter impervious to changes in the temperatures of the ink supply, the local electronic components and the ambient air temperature.

SUMMARY OF THE INVENTION

This ink jet device is formed from two chips of silicon. On one surface of one chip, the channel chip, is etched an array of ink jet channels and an ink reservoir which holds a small amount of ink. This reservoir is fed from an inlet which connects an opening in the device to a main reservoir off the chip. This piece of silicon can be thought of as passive since the features are only mechanical structures with no active electronic components.

The active electronic components such as the random logic and address logic, the device heaters, the sensors and the bubble jet heaters are formed on one surface of the other chip, the heater chip. Finally, the surfaces of the two chips are cemented together so that the channels line up with the associated bubble jet heaters to form a complete device. The design of the device therefore features the formation of the passive components, the channels and the reservoir, on the channel chip, and the active components on the heater chip.

The completed chip is mounted in the system so that the array of channels are lined up in the vertical direction. Therefore, as the array is scanned from one edge of the sheet to the other, a number of raster lines can be printed in one pass.

In a bubble jet system, the ink flows into the channel by capillary action and is forced out suddenly to form droplets. In order to drive the ink droplet out from the channel, a jet heater resistor is formed under each channel which is designed to be electrically driven by a high voltage pulse of short duration. The resistor is thermally coupled to the ink in the middle of the channel so that when the high voltage pulse is applied, a small amount of ink in the central portion of the channel will be instantly vaporized. This explosive expansion drives a droplet of ink out from the end of the channel.

The device described herein operates optimally at a temperature of fifty-five degrees Celsius. To control the temperature of the entire device, including the ink, the device has a number of distributed chip heater elements, and a temperature sensor mounted at a relative distance from the closest chip heater element, to sense the device temperature. The spacing and number of chip heater elements and the small size and inherent thermal conductivity of the device cooperate to distribute the heat rapidly and uniformly over the device, including the jet parts and the ink in the reservoir. This temperature is sensed by the sensor and acted upon by a controller, which in this embodiment is located off the device, to maintain the device at its predetermined temperature. The result is that the temperature of the entire device, including the ink, will be brought up to its predetermined temperature in a matter of seconds, and will be maintained there regardless of the ambient air and circuit board temperatures and the temperature of the ink in the main reservoir. The advantages of this system are that the warm up time is so brief as to be transparent to the user, and that the print quality will be maintained by the accurate maintenance of the predetermined temperature as long as the device is in use.

DESCRIPTION OF THE PREFERRED EMBODIMENT

Figure 1:
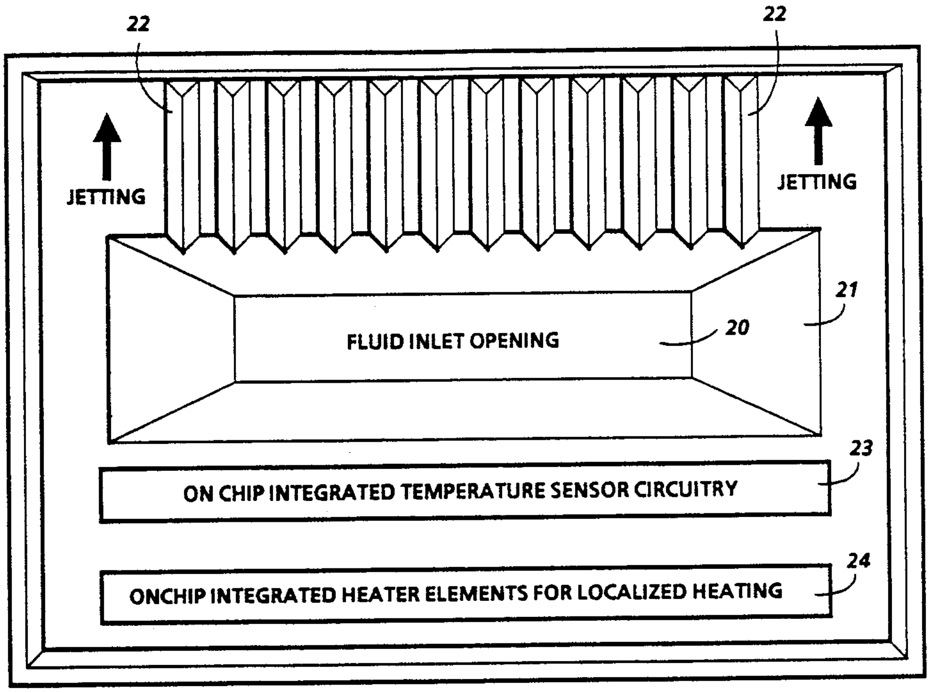
FIG. 1 is a simplified side view of the device.

FIG. 1 is an side view of the device, showing the construction details of a version which uses two slices of silicon, the chip pair, to implement the device. The heater chip has heater elements 24 for warming the chip, and a sensor assembly 23 for measuring the temperature of the chip. This heater chip is cemented to a channel chip that has etched into its surface a set of channels 22 which fill with ink by capillary action, and a reservoir 21 etched into it, containing a supply of ink for the chip. This reservoir communicates with the ink supply through an inlet opening 20.

The central portion of each channel is thermally coupled to a resistance which can be heated rapidly by the application of a high power electrical pulse to form a bubble by vaporizing a portion of the ink in the central portion of the channel. This forces an ink drop to be expelled from the end of the channel 22. When the electrical pulse ends, the vaporized ink reverts to its liquid form and the channel is again filled with ink.

Figure 2:
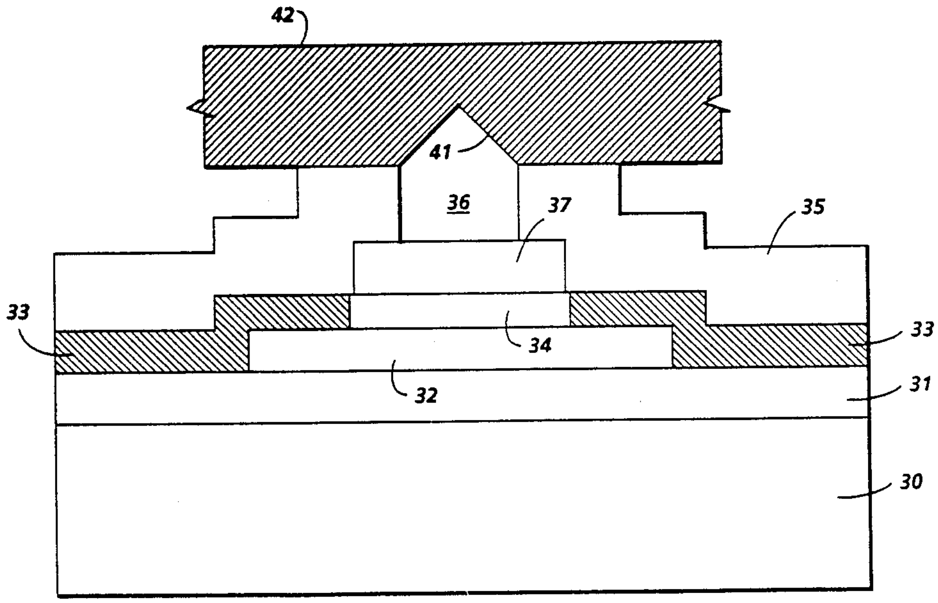
FIG. 2 is a cross sectional view of the structure of the resistance used to produce the bubble.

FIG. 2 is a cross sectional view of the structure of the resistance used to produce the bubble, as it is integrated on the heater chip. The process to produce this resistance starts with the growing of a silicon dioxide (oxide) layer 31 on the silicon substrate 30. Next, the heater resistor in the form of a layer of polysilicon 32 is formed on the oxide 31. Electrical connections to the two ends of the resistor 32 are formed from layers of deposited aluminum 33. A layer of insulating oxide 34 is grown on the poly silicon 32. A layer of tantalum 37 is deposited over the oxide 34. Finally CVD oxide 35 is deposited to cover all layers but the tantalum, and to create a depression 36 within which the vaporized bubble will be formed. The oxide layer 34 is necessary to electrically insulate the ink, which is at ground potential, from the resistance 32; and the tantalum layer 37 is necessary to protect the oxide 34 from cavitation effects. That is, in the projected lifetime of an ink jet about $10^8$ droplets are expected to be generated by each jet, and the cumulative mechanical shock produced by the formation and subsequent collapse of these vapor bubbles may damage the device. The tantalum layer 37 is added to add mechanical strength to the device.

Figure 3:
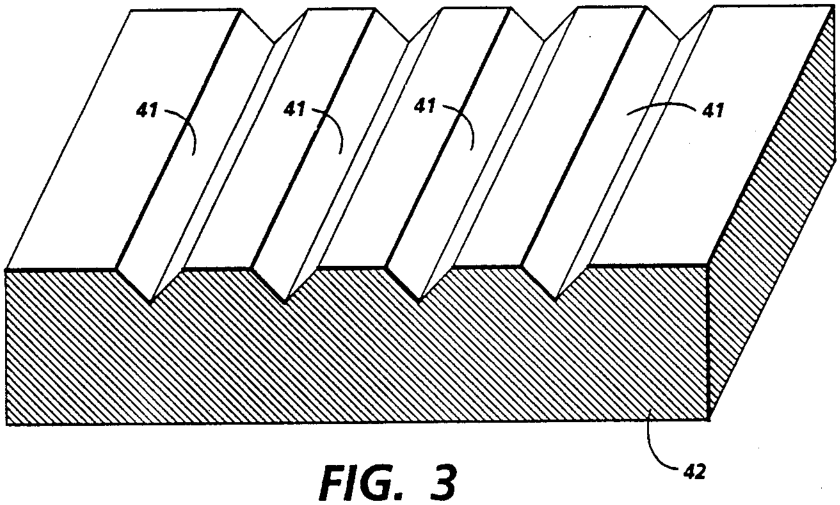
FIG. 3 is a cross section of the chip showing the etched channels.

The surface of the channel chip, shown in FIG. 3, is formed by etching channels 41 in the surface of the silicon slice 42. This is then cemented to the heater chip so that each channel 41 lines up with its associated depression 36, as shown in FIG. 2, which also shows the spatial relationship of a channel 41 in relation to the jet heater resistance 32.

Figure 4:
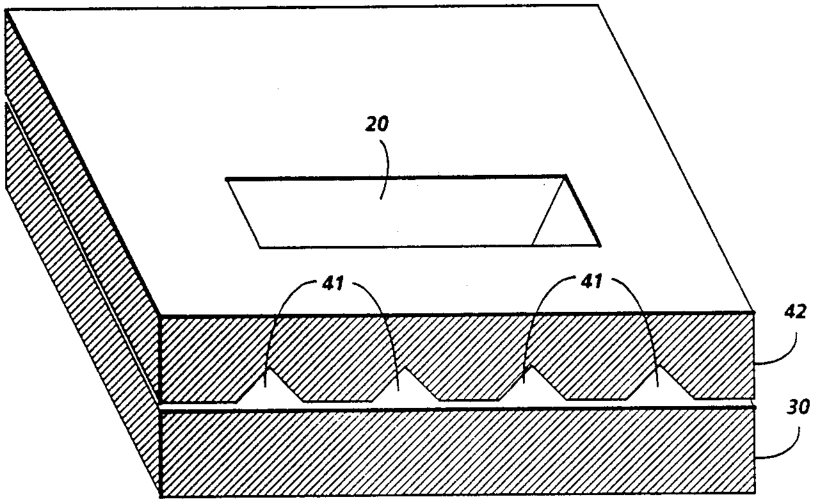
FIG. 4 is an overview of the entire chip pair.

The final result is a chip pair as shown in FIG. 4. The heater chip 30 is cemented to the channel chip 42 resulting in a chip pair having a fluid inlet opening 20 which ultimately supplies ink to the array of channels 41. In use, the chip pair is rotated ninety degrees from the orientation shown so that the array of channels is vertical. The ultimate printing density of the printer is a function of the number of channels per device and can be modified to fit the application. From fifty to more than a hundred channels per device are representative of the described embodiment.

Figure 5:
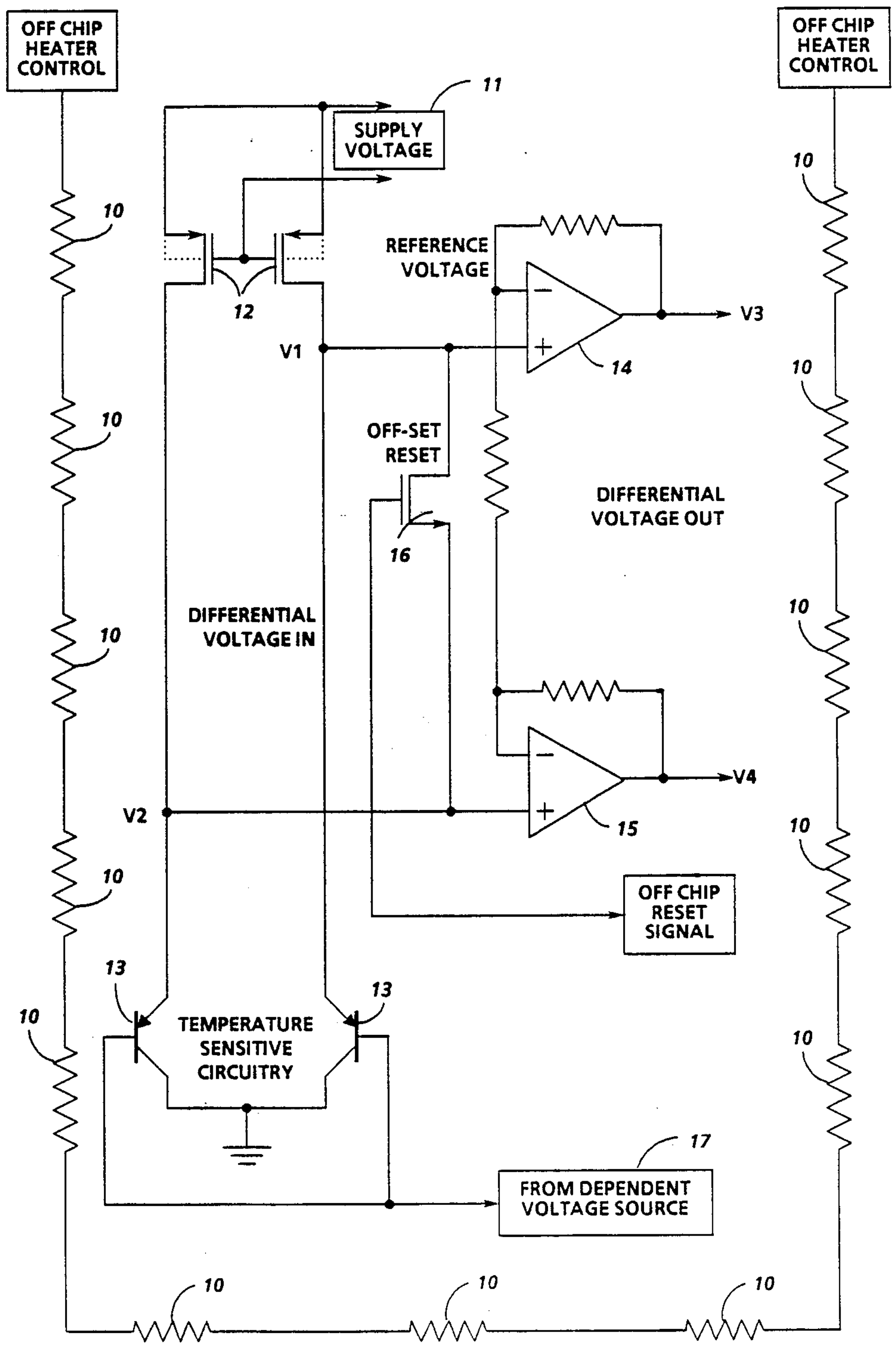
FIG. 5 is a block diagram of the control circuit.

FIG. 5 is a circuit diagram of the serially connected heater elements and the temperature sensor in the base of the device. The heaters 10 are distributed along three edges of the chip, as shown. These heaters are implanted polysilicon layers and the resistance is varied to the desired value and required power by controlling the geometry and varying the implant process.

The sensor circuit is driven by a supply voltage generator 11 which delivers current to two sensors 13 through two current sources 12. One of the current sources 12 is controlled to deliver ten times the current of the other. In both cases the current is used to forward bias the junctions of the emitters and commonly connected bases of the sensors 13, the bases also being connected to a return voltage source 17. The forward biased voltage drop of the two diodes will be different because of the difference in current, resulting in the emitter voltages labelled V1 and V2 also being different. In addition, this difference will also be a function of temperature. Therefore the differential output voltage between V1 and V2 will be an indication of the chip temperature.

The two sensing diodes 13 are designed to have equal area and a centroidal pattern to cancel process variations and achieve process insensitive electrical characteristics. Further, the sensor structure is surrounded by an N+ guard ring to improve sensor electrical characteristics and chip temperature measurement accuracy.

The sensor output voltages V1 and V2 are sent to a differential voltage amplifier comprising two operational amplifiers 14, 15. The differential output is taken at points V3 and V4.

There may be an offset voltage between points V3 and V4 because of variations between the two amplifiers 14, 15. This offset can be measured by first shorting together the two + input pins of amplifiers 14, 15. This is done by saturating transistor 16 on the receipt of a reset signal being applied to the gate. Since the − pins of the two amplifiers are already tied to the reference signal, any output difference that exists between the two output pins is the result of offset. For example, in the reset condition, the output at V3 may be one millivolt and the output at V4 may be three millivolts. Thereafter the system can take the two millivolt offset into consideration when reading the differential output, subtracting the offset prior to determining the actual chip temperature.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

We claim:

1. A thermal ink jet array device formed on a silicon substrate comprising:

an array of ink jet channels, an ink inlet, connecting means for allowing ink to flow from said inlet to said ink jet channels, a sensor means for sensing the temperature of said device and for outputting a signal which is a function of the device temperature, said sensor means comprising a temperature sensing element, and a differential amplifier for outputting said signal which is a function of the temperature sensed by said sensing element, and means for heating coupled to said signal for heating said device, said channels, inlet and connecting means being cavities etched into said silicon substrate, and said sensor means and means for heating being integrated on said silicon substrate.

2. A thermal ink jet array device formed on a silicon substrate comprising:

an array of ink jet channels, an ink inlet, connecting means for allowing ink to flow from said inlet to said ink jet channels, a sensor for sensing the temperature of said substrate and for outputting a signal which is a function of the device temperature, active electronic components integrated on said silicon device, and means for heating coupled to said signal for heating said device, said channels, inlet and connecting means being cavities etched into said silicon substrate, and said sensor, active components and means for heating being integrated on said silicon substrate.

* * * * *